United States Patent [19]

Hsu

[11] Patent Number: 5,047,742

[45] Date of Patent: Sep. 10, 1991

[54] STRUCTURE OF ELECTROMAGNETIC WORK HOLDER

[76] Inventor: P. J. Hsu, No. 5, Alley 1, Lane 250, Min Chuan East Road, Taipei, Taiwan

[21] Appl. No.: 658,619

[22] Filed: Feb. 21, 1991

[51] Int. Cl.$^5$ .............................................. H01F 7/20

[52] U.S. Cl. ........................................ 335/289; 269/8

[58] Field of Search ............... 335/289, 285, 286, 287, 335/288, 295; 269/8

[56] References Cited

U.S. PATENT DOCUMENTS 2,823,340 2/1958 Pierce ................................ 335/289

*Primary Examiner*—Leo P. Picard
*Assistant Examiner*—Raymond Barrera
*Attorney, Agent, or Firm*—Lowe, Price, LeBlanc & Becker

[57] ABSTRACT

A new structure of electromagnetic sucker comprising a sucker, a base, an intermediate plate and a solenoid in the form of a knockdown structure for the highest strength and precision and for even distribution of magnet force for the highest magnet attraction by using of the intermediate plate.

1 Claim, 6 Drawing Sheets

STRUCTURE OF ELECTROMAGNETIC WORK HOLDER

BACKGROUND OF THE INVENTION

Electromagnetic sucker has been widely used for holding of material in machining work because of its fastness, firmness and convenience, It has replaced the conventional means such as chuck and the like. Though its operation is fast and accurate, the quality of structure of electromagnetic sucker has a great effect to machining quality. For instance, its deformation caused by change of temperature, corrosion of bronze by acidic machining fluid, stress resulted from its production, and strength of bronze soldered to core at room temperature do affect quality of electromagnetic sucker. As shown in FIG. 1, a fragmental prospective of a conventional electromagnetic sucker, the sucker (A) of the prior art is in the form a square iron sheet with traverse ribs ($A_1$) and slots ($A_2$) on the surface for contacting with the flange ($B_1$) of a core (B) and the core ($C_1$) of the base (C). Fabrication of such sucker is quite complicated, inner stress may exist at the corners of the ribs ($A_1$) and affect the quality of the sucker (A) greatly. The core (B) and its separating plate (D) made of bronze are placed in each slot (A) of the sucker (A) and fixed there by soldering. However, hydrochloric acid remained on the surface of the sucker (A) after pickling, a necessary step in the preparation of sucker (A) can reach with the soldering agent chemically and hence adversely affect the soldering effect, the iron sheet will then rust. Moreover, as the core (B) and the bronze separating plate (D) are fitted into the slots ($A_2$) at room temperature, there are different tightness from slot to slot, and inner stress exists. Upon change of temperature, precision of the surface of the sucker (A) is deteriorated, and then machining quality is adversely affected. Furthermore, complicated production procedure and waste of material are defects of such structure. Though there are kinds of improved suckers, such as that shown in FIG. 3, which were claimed as they are easy to make, save materials, lower production cost and improve precision, they can't eliminate the defects of the prior art. As shown in FIG. 3, such improved sucker is composed of convex iron core (m), separating plate (n) and intermediate element (o) by compression and soldering, and then fixed together by means of a frame (p). Such a structure has eliminated the need of forming ribs, but the fabrication of the frame (p) is very difficult, it is hard to control its dimension, and the same soldering process is used. Such a structure does not increase strength, and the defect of the prior art remains.

SUMMARY OF THE INVENTION

The main objective of the present invention is to provide a knockdown type electromagnetic sucker which is formed by fusion weld at high temperature to eliminate impurities on surface of iron material, melt and penetrate the copper alloy into the iron to increase the strength of sucker by three times, to reinforce the iron structure, to improve sucker's stability, and to minimize its deformation upon change of temperature, and to provide a smooth surface of junction between the iron and the copper alloy.

Another objective of the present invention is to provide an intermediate plate on the top of the core at the base to expand area of attraction, provide even magnetic force distribution, and to increase magnetic force to 17–19 kg/cm$^2$ form 11–13 kg/cm$^2$ of the prior art.

Another objective of the present invention is to provide knockdown type electromagnetic sucker which can have its dimension changed from time to time without using of fixed frame to lower production cost and to same material consumption.

The present invention is a new structure of electromagnetic sucker comprising a sucker, a base, an intermediate plate and a solenoid in the form of a knockdown structure for the highest strength and precision and for even distribution of magnet force for the highest magnet attraction by using of the intermediate plate. It is a breakthrough in the structure of electromagnetic sucker which eliminates the need of frame. The present invention does not provide a sucker with accurate surface precision, but also a easy to make and quick sucker.

DETAILED DESCRIPTION OF THE PREFERRED EMBODIMENT

Figure 1:
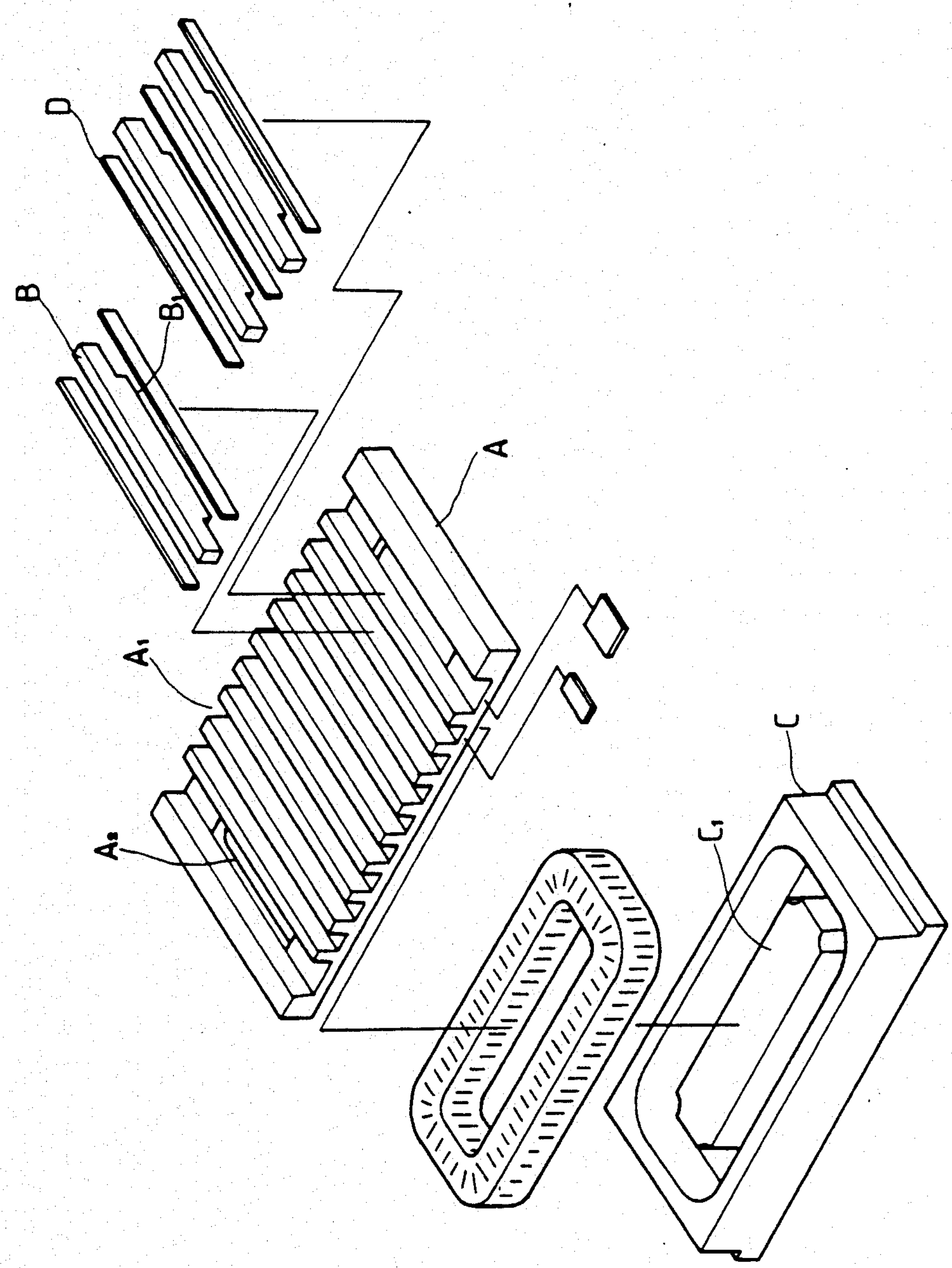
FIG. 1 is a fragmental prospective view of a conventional electromagnetic sucker.
Figure 2:
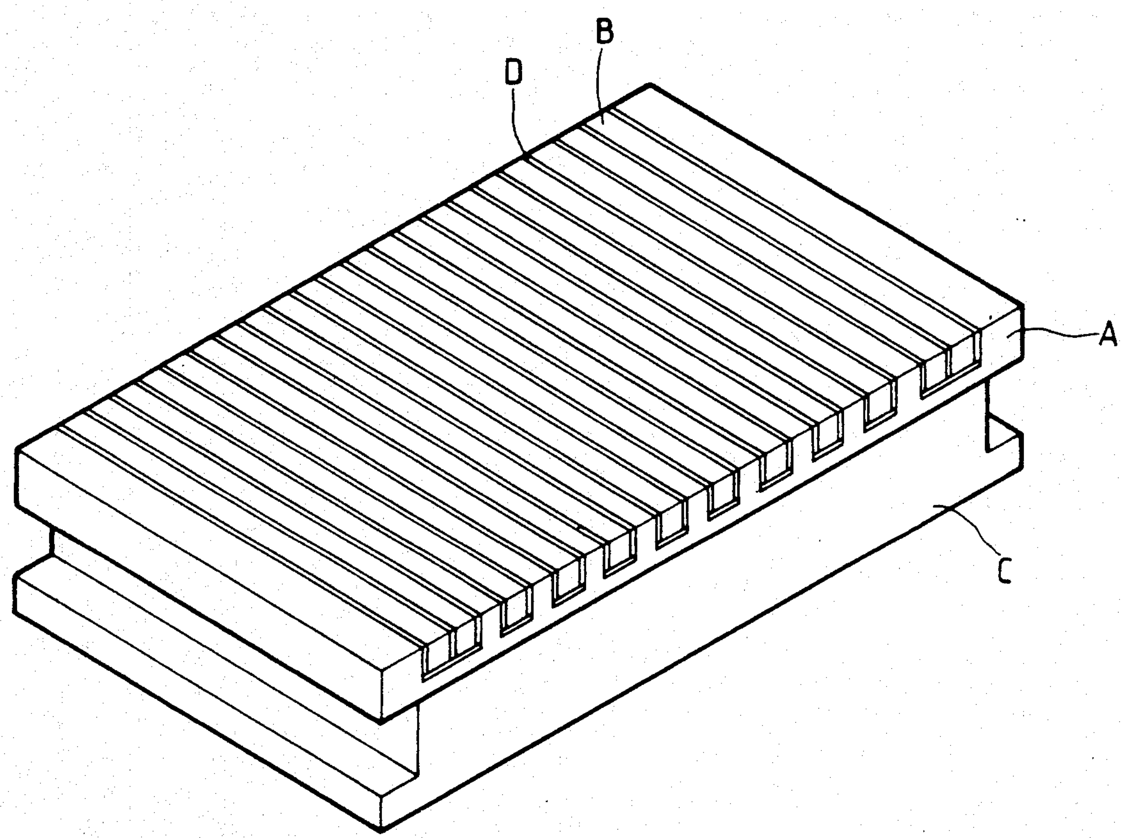
FIG. 2 is a prospective view of the conventional electromagnetic sucker.
Figure 3:
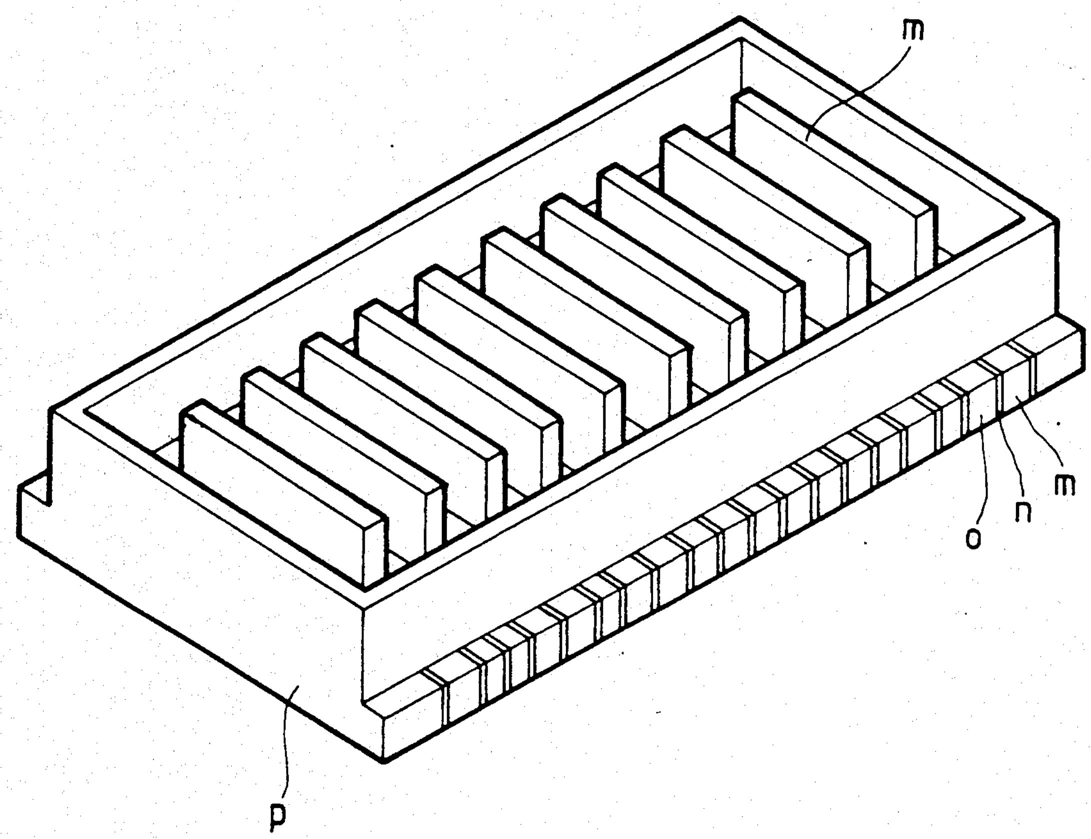
FIG. 3 ( illustrates the structure of another conventional electromagnetic sucker.
Figure 4:
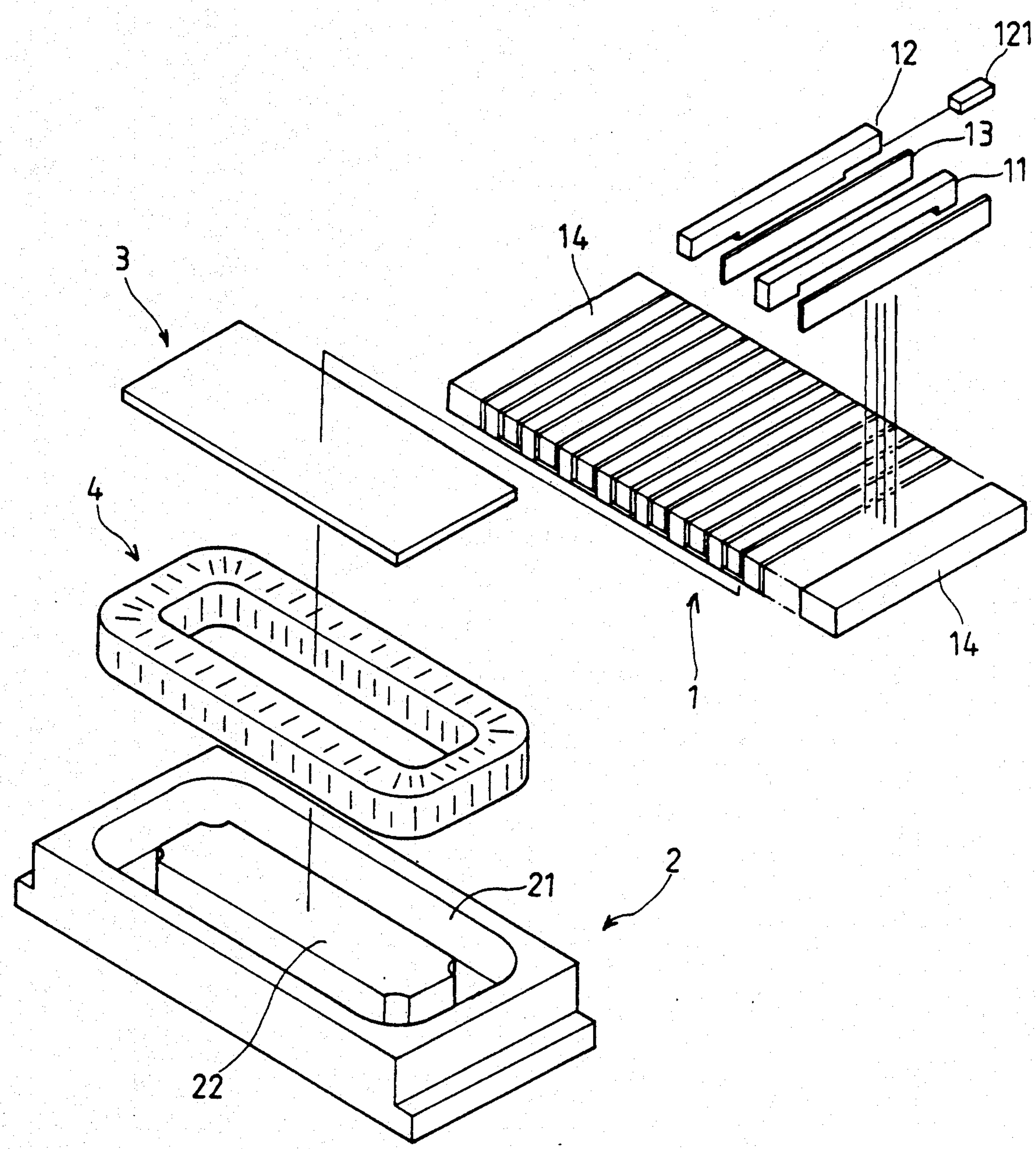
FIG. 4 is a fragmental prospective view of an embodiment according to the present invention.

As shown in FIG. 4, the present invention is comprising a sucker (1), a base (2), an intermediate plate (3), and a solenoid (4). The sucker (1) is composed of a plurality of rectangular concave and convex iron sheet (11 and 12) separated by non-magnetic copper alloy (13}and connected by means of pressure plates (14) at both sides. At the bottom of each lateral side of the convex rectangular iron sheet (12) is adhered with a pad (121) on the bottom of each lateral side. The base (2) has an 0-shaped recession (21) for holding of the solenoid (4). The base (2) has a core (22) in the middle. The intermediate plate (3) is in for the form of a square plate which is larger than the core (22).

Figure 5:
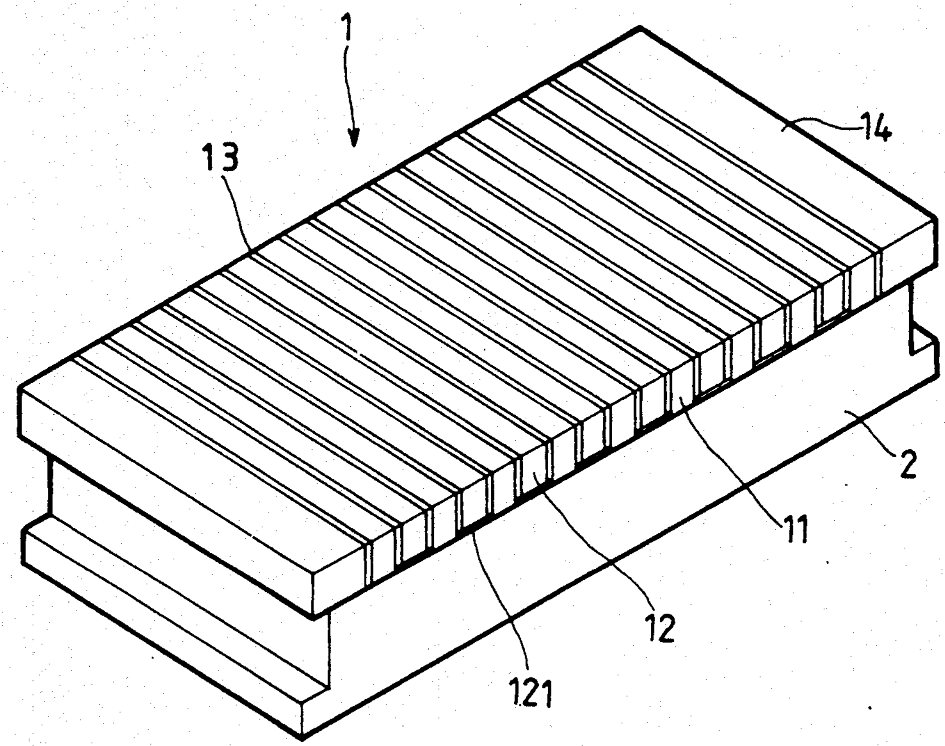
FIG. 5 :is a prospective view of the embodiment according to the present invention.
Figure 6:
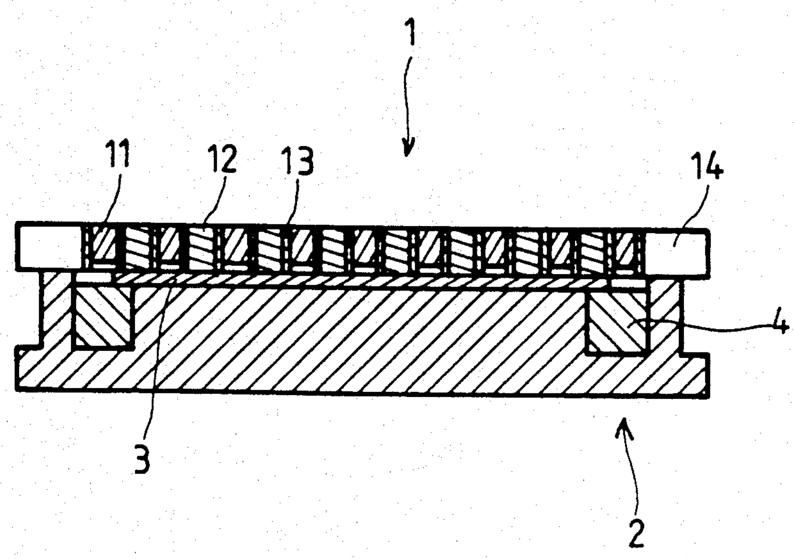
FIG. 6 is a cross sectional view of the embodiment according to the present invention.

After placing the solenoid (4) in the 0-shaped recession (21) of the base (2), the intermediate plate (3) is secured on the top of the core (22), and finally the sucker (1) is fixed on the top of the base (2) in a manner that the convex iron sheet (12) keeps contact with the intermediate plate (3) and the concave iron sheet has two lateral sides to keep contact with the base to form a magnetic field with attraction force as shown in FIGS. 5 and 6.

The present invention is characterized by the assembly of the rectangular iron sheets (11 and 12), the copper alloy (13) and the pressure plate which are held together with welding. When the sucker (1) is subject to compression at high temperature, change of its structure is steady. Therefore, the sucker (1) will not deform while it is operated at high working temperature. Moreover, the joint between copper alloy (13) and the rectangular iron sheets (11 and 12) will become stable after compression at high temperature, and the strength of such joint is estimated above three times of the prior art. The knockdown structure of such a sucker make its fabrication and assembly very easy, it is suitable for mass production and storage. Furthermore, the sucker according to the present invention can be adjusted to any size as required by its user, and the design of such intermediate plate (3) can expand its working surface for even distribution of magnetic force on the sucker, which is about 17–19 kg/$cm^2$, and is available even at the edge of the sucker.

I claim:

1. A structure of electromagnetic sucker comprising a sucker, a base, an intermediate plate and a solenoid, in which the sucker is composed of a plurality of convex and concave rectangular iron sheets separated by non-magnetic copper alloy and connected together with pressure plates at two lateral sides, the convex rectangular iron sheet is adhered with a pad at the bottom of each lateral side, the base an O-shaped recession for holding of the solenoid, and has a core in the middle, the intermediate plate is a magnetic square plate placed above the core, and the sucker is secured to the top of the base in a manner that the convex iron sheet keeps contact with the intermediate plate and the concave iron sheet has two lateral sides to keep contact with the base to form a magnetic field with attraction force; and characterized by the tight assembly of the sucker by means of welding at high temperature.

* * * * *